May 28, 1974 M. POTIN 3,813,459
PROCESS FOR MAKING THE STOPS OF A SLIDE FASTENER
Original Filed Aug. 4, 1970 4 Sheets-Sheet 3
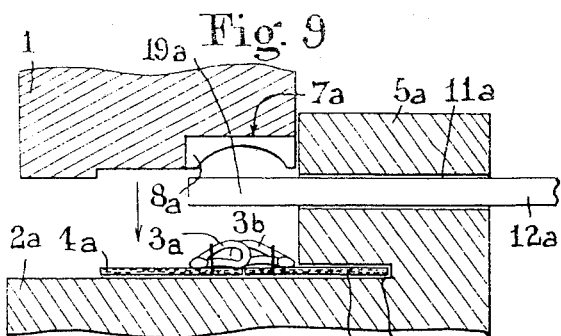
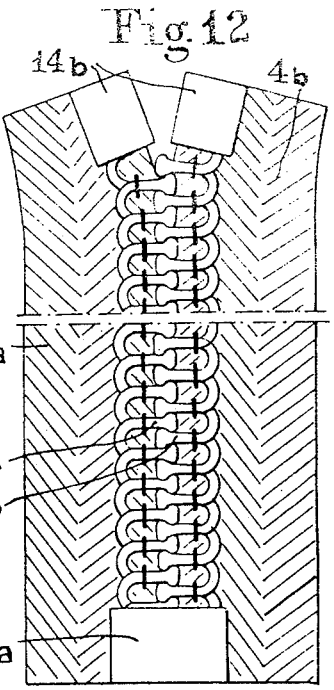
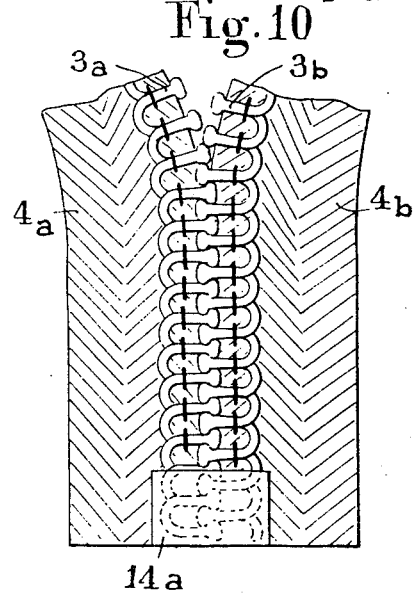
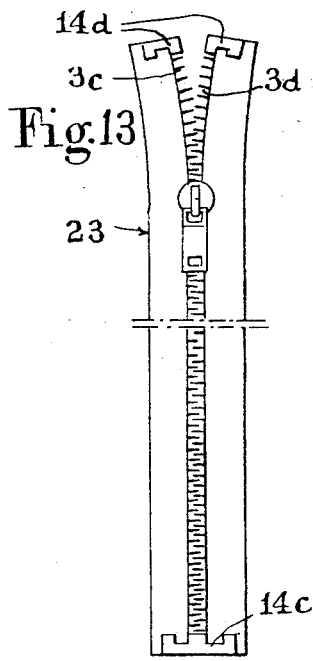
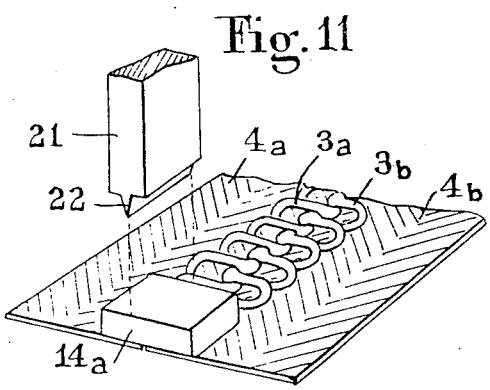

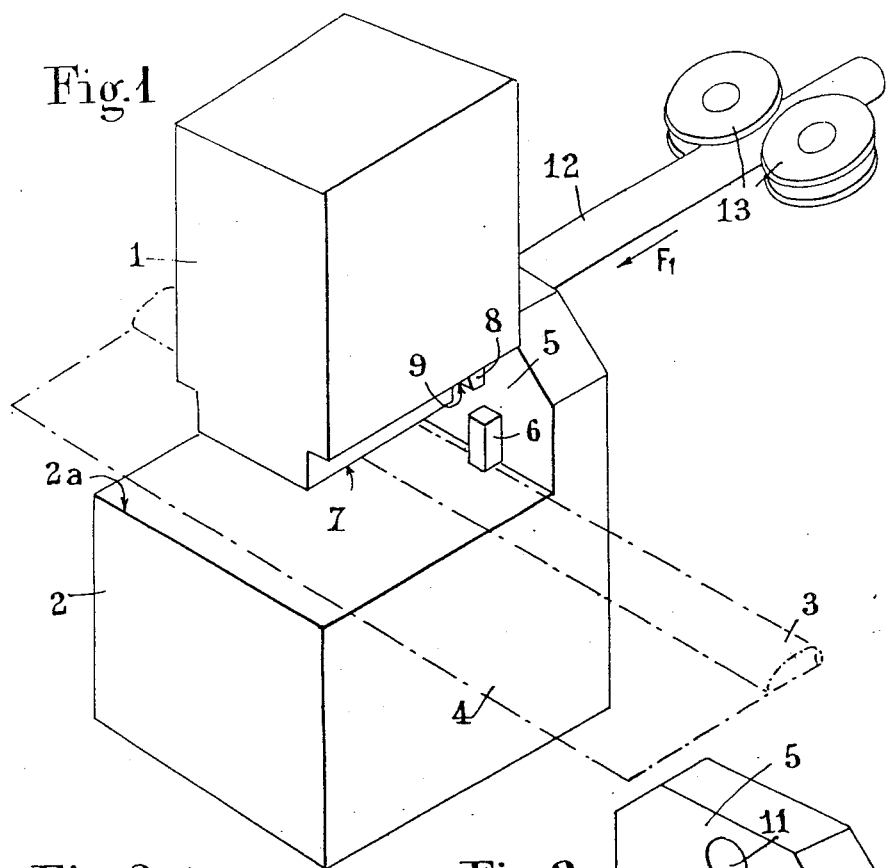
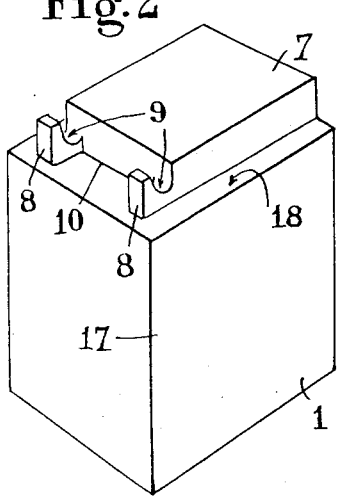
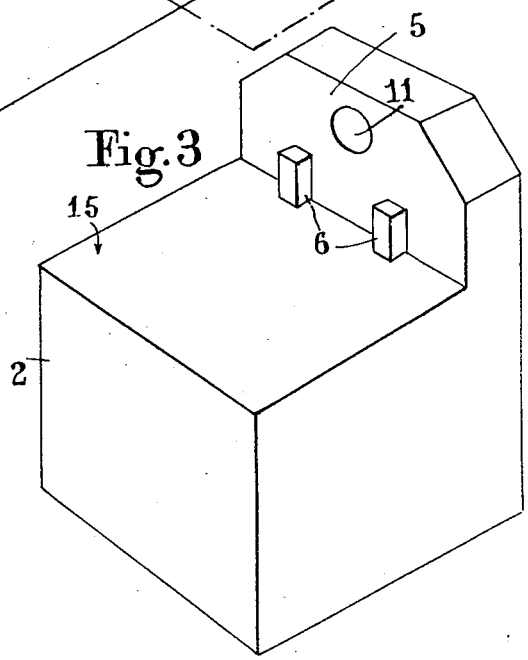

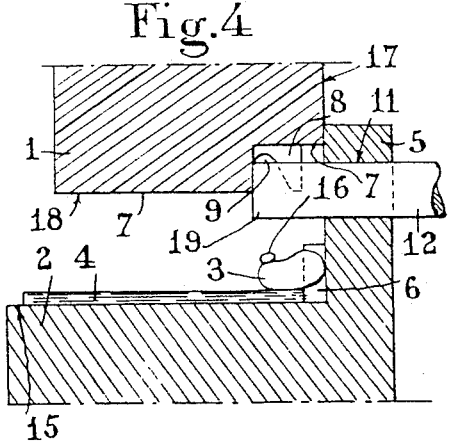
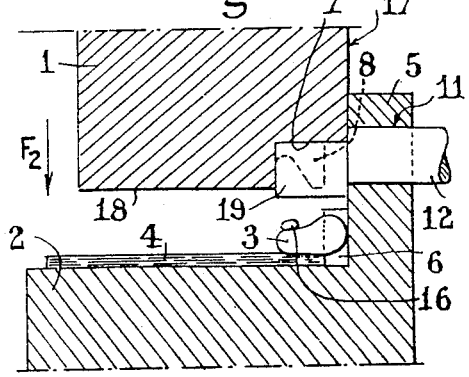
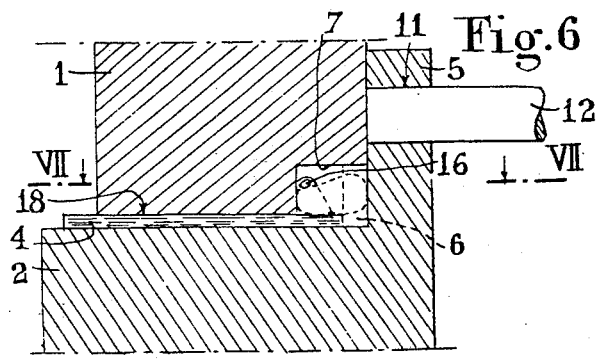
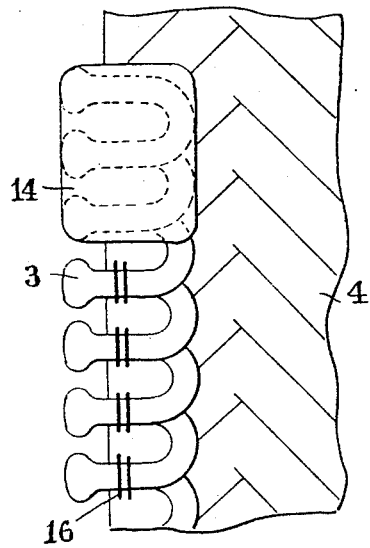
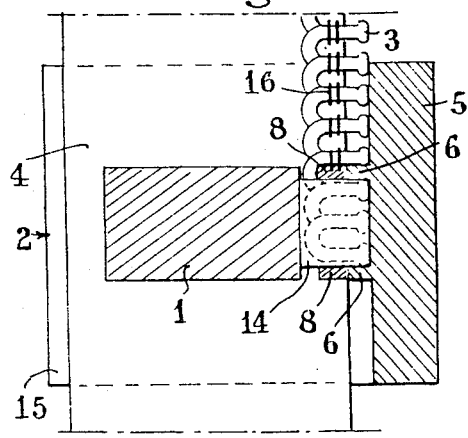

3,813,459
PROCESS FOR MAKING THE STOPS OF A SLIDE FASTENER

Marcel Potin, Choisy-le-Roi, France, assignor to Societe Financiere Francaise de Licences et Brevets, Choisy-le-Roi, France
Original application Aug. 4, 1970, Ser. No. 60,891. Divided and this application Oct. 25, 1972, Ser. No. 300,448
Claims priority, application France, Aug. 7, 1969, 6927109; June 1, 1970, 7019985
Int. Cl. B29d 5/00
U.S. Cl. 264—23                 5 Claims

ABSTRACT OF THE DISCLOSURE

The invention provides a process for making the stops at the ends of the rows of interlocking units in a slide fastener by moulding these stops from thermoplastic material directly on to the ends of the rows of the interlocking units, the operation being performed by positioning the corresponding row of interlocking units between two complementary parts forming a stamp and a block and by also placing between these two parts a fragment of thermoplastic material obtained by cutting it from the end of a continuous strip of such material which is moved forward in jerks, the fragment being moulded by subjecting it to the effect of heat, for example by transmitting ultrasonic vibrations to it while it is held between the two parts which form the stamp and the block and, after joining, leave between them a die cavity in the shape of the stop which is to be made.

---

This application is a division of copending application Ser. No. 60,891, filed Aug. 4, 1970.

This invention relates to the making of stops provided at the ends of the two rows of interlocking units in a slide fastener, in order to limit the travel of the latter's control slide.

Such stops can usefully be made by moulding them out of thermoplastic material directly on to the rows of interlocking units. For this purpose, the ends of these rows are inserted between the two complementary parts of a suitable mould and after joining the latter, the moulding operation is carried out by injecting thermoplastic material in a liquid state.

Such a process has undeniable advantages. However, it has a certain number of disadvantages which are inherent in the method of moulding used.

Thus, the two complementary mould parts have to be well locked together to make it possible to inject the thermoplastic material in a liquid state under pressure. This means, therefore, that the two mould parts have to be accurately machined and the two rows of interlocking units and the supporting tape perfectly positioned.

However, despite the precautions taken, leakages of the thermoplastic material do occur, from the fact that this is injected in a liquid state under comparatively high pressure.

The object of this invention is accordingly to make stops of this kind by a process which is free from the disadvantages mentioned above.

The invention also covers various specific forms of putting this process into operation, which make it possible to make various types of stops at the ends of slide fasteners.

The processs of the invention basically features the fact that a stop is made by positioning the corresponding row of interlocking units between two complementary parts forming a stamp and a block respectively and by also placing between these two parts of fragment of thermoplastic material obtained by cutting it from the end of a continuous strip of such material which is moved forward in jerks, and the fact that this fragment is moulded by subjecting it to the effect of heat, e.g. by transmitting ultrasonic vibrations to it while this fragment is held between the two parts which form a stamp and a block and, after joining, leave a die cavity between them in the shape of the stop which is to be made.

In a preferred form of this process, the fragment of thermoplastic material is moulded by ultrasonics, by activating one of the two complementary mould parts by ultrasonic vibrations, in practice the movable part forming the stamp.

This invention also includes a device for putting this process into operation. This device is made up of a combination of two complementary mould parts forming a stamp and a block respectively, at least one of which is movable in relation to the other, and which, after joining, leave a die cavity between them in the shape of the stop to be made, suitable feed means moving a strip of thermoplastic material forward in jerks so that its end engages between the "sonotrode" sonic electrode and the block, while means of cutting then cut off the end of this strip which has thus been inserted between these two parts.

However, this device can be constructed in different ways according to the particular methods of putting the process itself into operation.

Moreover, other features and advantages of the process and the device of the invention will be apparent from the following description of a constructional example of the latter.

This description is given with reference to the accompanying drawing, which is by way of example only, and wherein:

FIG. 1 is a view of the device for putting the process of the invention into operation;

FIG. 2 is a view of the movable stamp incorporated in this device, after inversion thereof;

FIG. 3 is a view of the block in this same device;

FIGS. 4 to 6 are partial vertical section views of this device, showing it during the various successive stages of operation;

FIG. 7 is a cross-section along the line VII–VII in FIG. 6;

FIG. 8 is a view from above of a stop made with this device, using the process of the invention;

FIG. 9 is a vertical section view of another form of construction of the device of the invention;

FIG. 10 is a partial view from above showing a stop made with this device, the purpose of which is to join together the two rows of interlocking units of the same fastener;

FIG. 11 is a view diagrammatically illustrating a supplementary operation which can be carried out on a stop of this kind in order to split it lengthwise;

FIGS. 12 and 13 are views from above of fasteners comprising end stops made with the devices in FIGS. 9 and 11;

Figure 14:
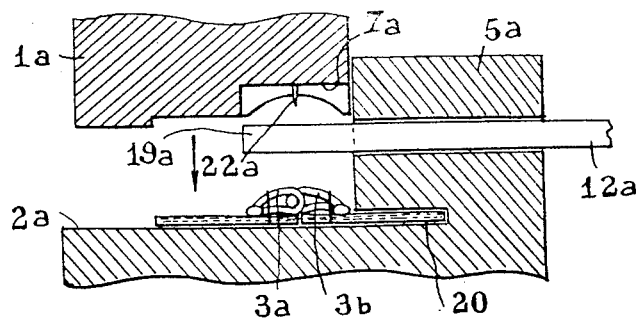
FIG. 14 is a vertical section view of yet another form of the device of the invention.

The device shown in FIGS. 1 to 7 is basically made up of a combination of two complementary mould parts one of which forms a movable stamp 1 and the other a corresponding fixed block 2.

The top face 15 of the latter is designed to act as a support for the row of interlocking units 3 on which a stop is to be made at specific intervals. This block also acts as a support for the tape 4 on one selvedge of which this row of interlocking units is fixed with stitches 16.

On one of its sides, the top face 15 of this block comprises a vertical cheek 5 extending facing the corresponding side wall 17 of the sonotrode sonic electrode 1.

Suitable feed means (not shown) are also provided to move the row of interlocking units forward in jerks, so as to bring it to a standstill, at regular intervals of time, underneath the stamp 1, with a view to making a stop by the process of the invention.

In the constructional form shown, the device is designed to mould such a stop out of thermoplastic material by ultrasonics. For this purpose, the stamp 1 is fitted up to constitute a sonotrode sonic electrode activated by ultrasonic vibrations, in the same way as the sonotrodes fitted in some ultrasonic welding equipment. Moreover, this unit is mounted on an ultrasonic vibrations generator which is capable of transmitting such vibrations to it. On the edge facing the cheek 5 of the block, the bottom face 18 of this sonotrode comprises a cut-out section 7 designed to form the die cavity for the stop to be made. This die cavity is bounded at the ends by two projecting teeth 8 which are connected to the sonotrode 1 by means of two incurved portions 9.

There is the same distance between these two teeth as between two projecting studs 6 provided on the inside face of the vertical cheek 5 of the block. These two teeth are in fact designed to slide against these two studs when the sonotrode is applied to the block.

There is a clear space 10 between the two teeth 8, designed to form the die cavity for the stop to be made, this in combination with the clear space between the two studs 6.

However, these units are also intended to keep the row of interlocking units at a standstill during the moulding of the stop, as will be explained later.

The vertical cheek 5 of the block comprises an aperture 11 the axis of which is positioned transversally in relation to the row of interlocking units 3. The end of a strip 12 of thermoplastic material passes through this aperture. By means of this arrangement, the end part 19 of this strip, which projects beyond the vertical cheek 5 of the block, can be inserted in the clear space provided between the two teeth 8 of the sonotrode, while the latter is in a raised position (see FIG. 4).

Moreover, this device comprises suitable feed means capable of causing the strip 12 to move forward in jerks in the direction of the arrow $F_1$, in order to insert the end thereof in the cut-out section in the side of the sonotrode. These feed means may possibly consist of ordinary pulleys 13 positioned on either side of the strip 12.

The way in which this device works, in order to put the process of the invention into operation, is as follows:

The row of interlocking units 3 and its supporting tape 4 move along the top face 2a of the block, kept slightly away from the inside face of the vertical cheek 5 of the latter. When a spot along this row of interlocking units, where a stop is to go, comes underneath the sonotrode, a translatory movement in a transversal direction is imparted to this row and to the tape 4 in order to apply the interlocking units against the vertical cheek 5 of the block. In these circumstances, the two studs 6 on this cheek penetrate into the corresponding spaces in the interlocking units, as shown in FIG. 4. This consequently brings this row of units to a standstill.

At that time, the sonotrode 1 is in a raised position, so that it is away from the block. Moreover, the end part 19 of the strip 12 of thermoplastic material is inserted in the cut-out section in the side of the sonotrode.

Then, during a second stage, the latter is moved in the direction of the arrow $F_2$ towards the block, by suitable feed means. In these circumstances, the end part 19 of strip 12 is sheared between the cheek 5 and the sonotrode. This consequently cuts off the corresponding fragment of thermoplastic material which is thenceforth drawn along by the sonotrode, this fragment being positioned between the two teeth 8 of the latter (see FIG. 5).

At the end of the movement, when the sonotrode is applied against the block, the teeth 8 are positioned against the studs (see FIGS. 6 and 7). The teeth 8 are thus engaged in the spaces between the interolcking units inside which the studs 6 were already engaged.

These teeth and these studs form the boundary of the die cavity at its two ends. In fact, the ultrasonic vibrations transmitted by the sonotrode to the fragment 19 of thermoplastic material soften this fragment and mould it in the corresponding die cavity. The material of this fragment then penetrates between the interlocking units which are in the die cavity, and this material is moreover welded to the interlocking units when the latter are also made of thermoplastic material.

In any case, the interlocking units are submerged inside the plastic part 14 so obtained and which forms a stop on the corresponding fastener.

After this operation, the sonotrode 1 is again raised to the "up" position and the row of interlocking units resumes its forward movement, while the strip 12 of thermoplastic material is again pushed in the direction of the arrow $F_1$ in order to insert the end part in the cut-out section in the side of the sonotrode.

This device and the process covered by the invention make it possible to make a series of stops designed ultimately to constitute so many separate fasteners of a specific length, at an industrial rate, along one continuous chain of interlocking units.

Now, this device and this process have the advantage of being free from the disadvantages which were encountered when making stops of this kind by moulding them by injecting plastic material. In fact the constituent parts of the device do not need to be as carefully machined as the parts of the injection mould. Moreover, there is no risk of the thermoplastic material leaking since it is not subjected to such high pressure as in the case of injection moulding.

The process and the device of the invention are not limited to the single example described above. Moreover, this device could comprise the following modifications.

(a) The die cavity used for moulding the stop could be fitted on the block, instead of being positioned on the sonotrode.

(b) The plastic feel strip could pass through an aperture provided in a vertical cheek borne by the sonotrode, instead of passing through the cheek 5 on the block. In fact, due to the flexibility of this plastic strip, it could very well follow the movements of the sonotrode.

(c) This strip could be brought between the sonotrode and the block from any desired direction. In fact, it would be possible to run this strip longitudinally, or in any other direction, forming any angle in relation to the axis of the row of interlocking units.

The process and the device of the invention can be used to make stops at the ends of the rows of interlocking units corresponding to the opening end of a slide fastener.

However, this process and this device can also be used to make stops at the opposite end, i.e. at the end where the two rows of interlocking units are inseparably joined. FIG. 9, in fact, shows a device designed for this purpose.

The general structure of this is the same as that of the device in FIGS. 1 to 7. In fact, it comprises the same components, which thus bear the same reference numbers, with the letter $a$ suffixed. However, the fixed block 2a is arranged so as to act as a support for the two tapes 4a and 4b bearing the two corresponding rows of interlocking units 3a and 3b. For this purpose, the side cheek 5a on this block has a slot 20 which can take one of the two tapes 4a or 4b. This slot thus constitutes a means of guiding the continuous chain formed by the two rows of interlocking units and their supporting tapes.

Moreover, in this form of construction, the studs 6 previously provided are eliminated.

Of course, the dimensions of the die cavity 7a bounded by the teeth 8a are suitable to make a stop 14a straddling the two rows of interlocking units 3a and 3b as shown in FIG. 10.

The process of making a stop of this kind by means of this device is the same as in the previous case. However, a stop 14a straddling the two rows of units 3a and 3b is so obtained and thus holds the corresponding interlocking units at that spot, thus joining them together. This device thus makes it possible effectively to make a stop for the closed end of a slide fastener.

However, this same device can be used indiscriminately to make the stops at both ends of the same fastener, i.e. the opening end and the closed end, provided one of the two stops made is subsequently cut lengthwise along the middle to divide it into two separate stops, one on each of the two corresponding rows of interlocking units.

This subsequent cutting operation can be carried out by means of a suitable tool. This may consist of a standard knife or any other cutting tool, e.g. scissors, a mechanical or pneumatic press, a circular saw, etc.

However, this cutting operation can also be done ultrasonically by using a sonotrode 21 with a sharp edge 22 (see FIG. 11).

In fact, the ultrasonic vibrations transmitted by this cutting edge have the effect of making a slot along the whole length of the corresponding stop 14a. Of course, this slot is made so as to cut this stop into two equal halves 14b, on either side of the median axis of the fastener chain. In this way two separate stops are therefore obtained, each of which is borne by one of the two rows of interlocking units of the fastener (see FIG. 12).

In these circumstances, the device shown in FIG. 9 makes it possible indiscriminately to make stops designed to fit one or other end of the same fastener.

In the one case, the stop so obtained can be used as it is. In the other, it is sufficient to subject it to a very simple supplementary operation to cut it into two equal parts lengthwise.

In this connection, it should be noted that this operation can be carried out either immediately after moulding of the stop or later, at any desired time. Of course, the two stops 14a provided at the two ends of the same fastener can be made simultaneously.

For this purpose, it is sufficient to use two devices such as the one described in FIG. 9, allowing a gap between them corresponding to the length of the corresponding fastener.

The working of these two devices is then synchronized so as to make the two stops 14a at the same time. It is then sufficient to split one of them lengthwise to obtain the two separate stops which are to equip the opening and closing end.

It should also be noted that the sonotrode 21 used for this purpose can be associated with the device for making the corresponding stop. In fact, this sonotrode can be fixed on a rotating head also bearing the sonotrode 1. Such an arrangement makes it possible successively to apply the sonotrode 1a when a stop 14a is made, then the sonotrode 21 to cut this stop lengthwise. However, it is obviously possible to make another suitable arrangement making it possible to use the sonotrodes one after the other.

Moreover, it goes without saying that the stops made by this process can be of different shapes. Thus, FIG. 13 shows a slide fastener bearing the overall reference 23 at the ends of which stops 14c and 14d of different shapes have been moulded, which overlap sideways in relation to the two corresponding rows of interlocking units 3c and 3d, contrary to the previous case.

This invention also covers a particular process for making and fitting a slide fastener to a specific article, applying the process for making end stops as described above.

In accordance with this making and fitting process, a length of fastener chain is first fixed to the two edges of the opening in the corresponding article, e.g. a garment. This fixing is done while the interlocking units of the two rows of the chain are joined at both ends of the length in question. A slide is then threaded on to it, if this operation has not been done before.

But the two rows of interlocking units then have to be joined beyond the slide so that the length of fastener chain is closed at both ends. The latter are then successively put through a device such as the one shown in FIG. 9.

When the two stops 14a have been made, straddling the two rows of interlocking units, one of these stops is split, as previously described. This operation can then be carried out immediately or later, at any desired time.

Figure 15:
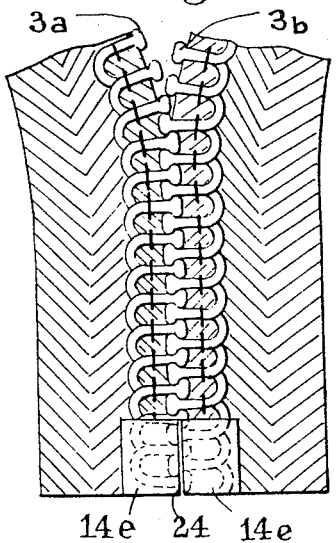
FIG. 15 is a partial view from above of a fastener comprising stops made with this device.

However, the device and the making process covered by the invention are not limited to this one application. Moreover, this process and this device can themselves be subject to operational variations. In fact, FIGS. 14 and 15 show a variation of this kind, wherein the operation of cutting a stop extending over the two rows of interlocking units is carried out more or less simultaneously with its mouldings.

The device provided for this purpose is identical to the one shown in FIG. 9, with the single difference that a projecting cutting edge 22a is provided in the die cavity 7a in the sonotrode 1a. Of course, this edge extends longitudinally to the fastener chain, and it is positioned in the middle of the die cavity 7a.

Thus, when this device is used, the moulded stop is immediately cut lengthwise into two different stops 14e separated by a slot 24 made by the edge 22a.

It should be noted that this result is due to the particular properties of a unit activated by ultrasonic vibrations. In fact, the flat parts of such a unit, such as the bottom of the die cavity 7a, can heat a fragment of thermoplastic material and mould it into the corresponding shape, while the sharp edges, such as the edge 22a, can for their part cut the fragment of plastics material at the point in question.

Thus the device shown in FIG. 14 makes it possible immediately to obtain two separate stops on the open end of a slide fastener. A device of this kind can thus be combined with the one shown in FIG. 9 in order to make the stops at the two ends of the same fastener simultaneously. For this purpose, it is sufficient to allow a suitable gap between these two devices.

But here again, the process and the device covered by the invention can be subject to many other variations. Moreover, it should be noted that in several of the methods of operating the process and this device, these are not limited to moulding by ultrasonics. In fact, this moulding can also be done by heating the fragment of thermoplastic material from a source of heat provided by any suitable means.

I claim:

1. A method for forming stops at the ends of rows of interlocking fasteners, said fasteners comprising spaced whorls of thermoplastic filament in an apparatus including a mold cavity comprising two parts, one said part including a pair of studs spaced apart a distance equivalent to the spacing between a selected number of whorls of said fastener, comprising the steps of continuously feeding said fastener in a first linear path between the parts of said mold with said studs adjacent and laterally offset from said fastener, thereafter laterally shifting said mold halves relative to said fastener to insert said pair of studs in the spaces between whorls of said fastener to inhibit further movement of said fastener in said path, thereafter introducing an increment of thermoplastic material from a continuous strip into the space between said mold halves and said studs, thereafter shifting said mold halves toward each other to the cavity defining position thereof while simultaneously applying heat to said increment of material and fastener portion between said studs, thus to sever and melt said increment and fuse the same to the portions of said fastener within said cavity.

2. The method of claim 1 wherein said increment is advanced stepwisely in a direction normal to said linear path and to the direction of closing movement of said mold parts.

3. The method of claim 1 and including the step of severing said molded stop while the latter is still liquid along a line substantially parallel with said path.

4. The method of claim 1 wherein said heating step is performed by ultrasonic vibration.

5. The method of claim 1, including the steps of attaching said fastener to an article and positioning a slider on said fastener prior to molding of said stops.

References Cited

UNITED STATES PATENTS

| | | | |
|---|---|---|---|
| 3,340,594 | 9/1967 | Frohlich | 29—408 |
| 3,672,008 | 6/1972 | Moertel | 24—205.11 F |
| 3,686,719 | 8/1972 | Johnston | 24—205.11 F |
| 3,436,006 | 4/1969 | Cole | 264—23 X |
| 3,510,379 | 5/1970 | Heimberger | 24—205.11 F |
| 3,340,594 | 9/1967 | Frohlich | 24—205.11 F |
| 3,488,239 | 1/1970 | Heimberger | 24—205.11 F |

RICHARD R. KUCIA, Primary Examiner

U.S. Cl. X.R.

264—163